US006942454B2

(12) United States Patent
Ohlmann

(10) Patent No.: US 6,942,454 B2
(45) Date of Patent: Sep. 13, 2005

(54) VERTICAL AXIS WIND TURBINE

(76) Inventor: Hans-Armin Ohlmann, 166 Piper St., Ayr Ontario (CA), N0B 1E0

( * ) Notice: Subject to any disclaimer, the term of this patent is extended or adjusted under 35 U.S.C. 154(b) by 0 days.

(21) Appl. No.: 10/724,146

(22) Filed: Dec. 1, 2003

(65) Prior Publication Data

US 2004/0141845 A1 Jul. 22, 2004

Related U.S. Application Data

(60) Provisional application No. 60/430,074, filed on Dec. 2, 2002.

(51) Int. Cl.[7] .................................................. F03D 3/02
(52) U.S. Cl. ...................... 416/11; 416/132 B; 415/4.2; 415/151; 290/55
(58) Field of Search ............................ 290/55; 415/4.2, 415/4.4, 907, 2.1, 4.1, 8, 60, 70, 121.3, 151, 156, 183, 198.1; 416/120, 122, 9–17, 146 R, 197 A, DIG. 4, 132 B

(56) References Cited

U.S. PATENT DOCUMENTS

| 419,345 A | * | 1/1890 | Otto ............................ 415/4.2 |
| 2,335,817 A | * | 11/1943 | Topalov ....................... 415/4.4 |
| 4,047,833 A | * | 9/1977 | Decker ........................ 415/4.4 |
| 4,156,580 A | | 5/1979 | Pohl |
| 4,764,683 A | * | 8/1988 | Coombes ..................... 290/55 |

FOREIGN PATENT DOCUMENTS

| DE | 3403657 | 8/1985 |
| DE | 20006959 | 7/2000 |
| DE | 10054700 | 5/2001 |
| DE | 19957141 | 5/2001 |
| EP | 0064440 | 11/1982 |
| FR | 2509384 | 1/1983 |

* cited by examiner

*Primary Examiner*—Edward K. Look
*Assistant Examiner*—Richard A. Edgar
(74) *Attorney, Agent, or Firm*—R. Craig Armstrong; Borden Ladner Gervais LLP

(57) ABSTRACT

The vertical axis wind turbine has two counter-rotating rotors mounted on first and second spaced apart vertical axes. Each rotor has a plurality of rotor blades extending generally inwardly from an outer circumference, the vertical axes being mounted on a support structure which is in turn rotatable on a third vertical axis on a platform. The third axis is spaced from a point midway between the first and second axes in a direction at 90 degrees to and forward from a line between the first and second axes. The vertical axis wind turbine further has a guide vane mounted on the support structure, having a vertex forward of the third vertical axis in the direction at 90 degrees from a line between the first and second axes. The guide vane has left and right symmetrical vane portions extending towards the rotors so as to direct airflow from wind primarily towards portions of the rotors outboard of the first and second axes. The guide vane also tends to keep the vertical axis wind turbine oriented with the guide vane's axis of symmetry pointing forwardly into the wind. Movable deflector flaps pivotally mounted adjacent opposite ends of the vane portions can deflect air at least partially away from the rotors. The structure of the wind turbine can support an unrelated structure such as a restaurant.

8 Claims, 7 Drawing Sheets

VERTICAL AXIS WIND TURBINE

REFERENCE TO RELATED APPLICATION

This is a formal application based on and claiming priority from U.S. provisional patent application No. 60/430,074, filed Dec. 2, 2002.

BACKGROUND OF THE INVENTION

This invention relates to wind turbines, and in particular to wind turbines having a vertical axis.

For eons, wind power has been a source of energy and has been harnessed in various fashions. A profound distinction can be made between horizontal axis wind turbines (HAWTs) and vertical axis wind turbines (VAWTs).

In modern times, the prevalent concept is the HAWT, most frequently with three airfoil blades. While this type of wind turbine claims the highest efficiency, they are burdened with some substantial disadvantages:

a. They are mono-directional, which means they have to be turned into the wind.
b. Their minimum operational wind speed (cut-in speed) is relatively high and the maximum wind speed (cut-out speed) they can endure is relatively low, allowing for only a relatively narrow window of operation, beyond which they are prone to damage and have to stop operating.
c. Their serviceable components sit high up in the so-called nacelle, on top of a tall pillar, which is inconvenient for service and parts replacements.
d. Although they are considered "fast-runners" by the yardstick of their lift factor, their actual slewing speed is relatively low (typically in the range of 15 to 30 RPM), which necessitates expensive multi-stage gearboxes, which impacts negatively on the overall system efficiency and costs.
e. Many people consider HAWTs to have an ugly appearance and to be an insult to the landscape.
f. By their design, HAWTs do not lend themselves to do-it-yourself construction and actually grow attractive with size.

Nowadays commercial applications are but all exclusively covered by HAWTs. However, VAWTs avoid most of the above disadvantages, in that:

a. They are omni-directional.
b. The useful cut-in wind speed is lower and the cutout speed is higher, thus making the window of operation wider.
c. Their serviceable components can be concentrated at their bottom end and for easy accessibility.
d. Also considered "low runners" by their low lift factor, they actually slew faster, allowing for smaller-ratio gearboxes, which are less expensive and more efficient.
e. They allow for more flexible, pleasing designs.
f. They allow for operation at higher wind speeds (storms) with lower risk of getting damaged.
g. They lend themselves to simple design and construction.

The main disadvantage of omni-directional VAWTs is their substantially lower efficiency; the latter defined as the ratio between the latent energy in the wind and the actual power output.

SUMMARY OF THE INVENTION

It is an object of the invention to provide a vertical axis wind turbine (VAWT) with excellent efficiency, while maintaining most of the above-mentioned advantages of VAWTs.

In the invention, the VAWT has two counter-rotating rotors mounted on first and second spaced apart vertical axes. Each rotor has a plurality of rotor blades extending generally inwardly from an outer circumference, the vertical axes being mounted on a support structure which is in turn rotatable on a third vertical axis on a platform. The third axis is spaced from a point midway between the first and second axes in a direction at 90 degrees to and forward from a line between the first and second axes. The VAWT further has a guide vane mounted on the support structure, having a vertex forward of the third vertical axis in the direction at 90 degrees from a line between the first and second axes. The guide vane has left and right symmetrical vane portions extending towards the rotors so as to direct airflow from wind primarily towards portions of the rotors outboard of the first and second axes. The guide vane also tends to keep the VAWT oriented with the guide vane's axis of symmetry pointing forwardly into the wind.

Further features of the invention will be described or will become apparent in the course of the following detailed description.

BRIEF DESCRIPTION OF THE DRAWINGS

The invention will now be described in detail, with reference to the accompanying drawings of a preferred embodiment. In the drawings.

DETAILED DESCRIPTION

Figure 1:
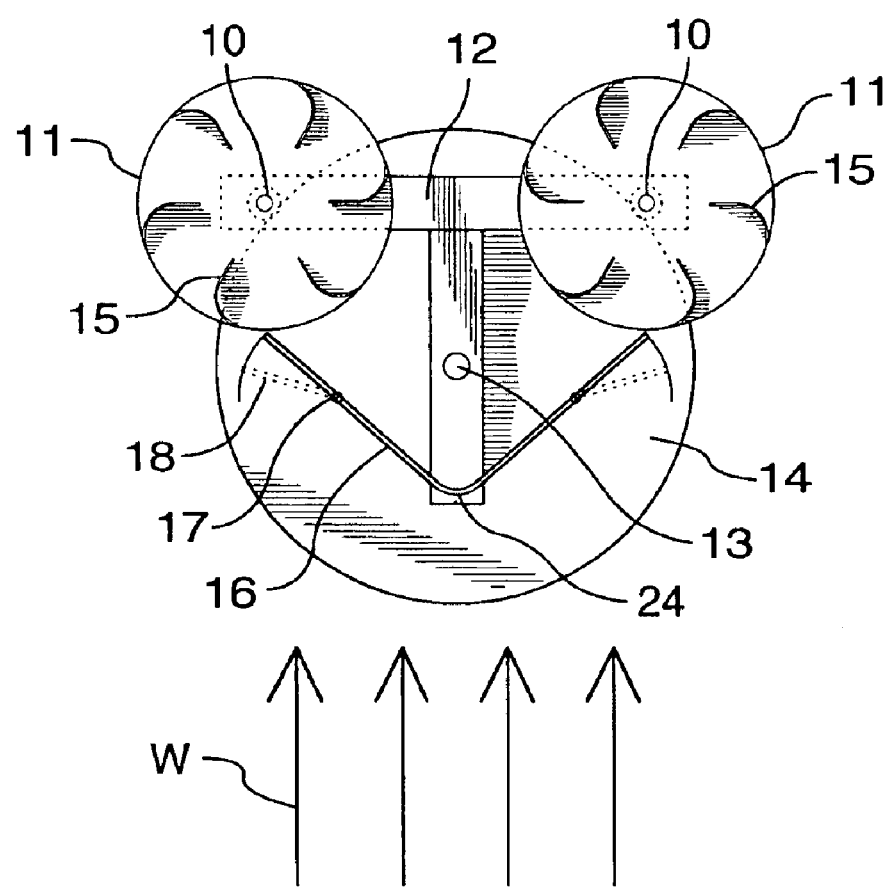
FIG. 1 is a top view of an exemplary embodiment of the vertical axis wind turbine (VAWT)

FIG. 1 is a top view of the vertical axis wind turbine (VAWT), from which the principle of the invention can be readily seen. There are two rotors 11 on a T-shaped support structure 12. Each rotor is mounted on a rotor axis 10. The support structure is rotatable around a center axis 13 on a support platform 14, which in turn will sit on a cylindrical foundation or tower (not shown) of a height determined by topographical parameters. Preferably, the rotors feature six blades 15 each, though that number could vary if desired. One vertical, curved guide vane 16 mounted on the support structure sits centered in front of the two rotors 11. Preferably, two vertical hinges 17 render the two straight ends of the guide vane 16 into deflector flaps 18.

Figure 2:
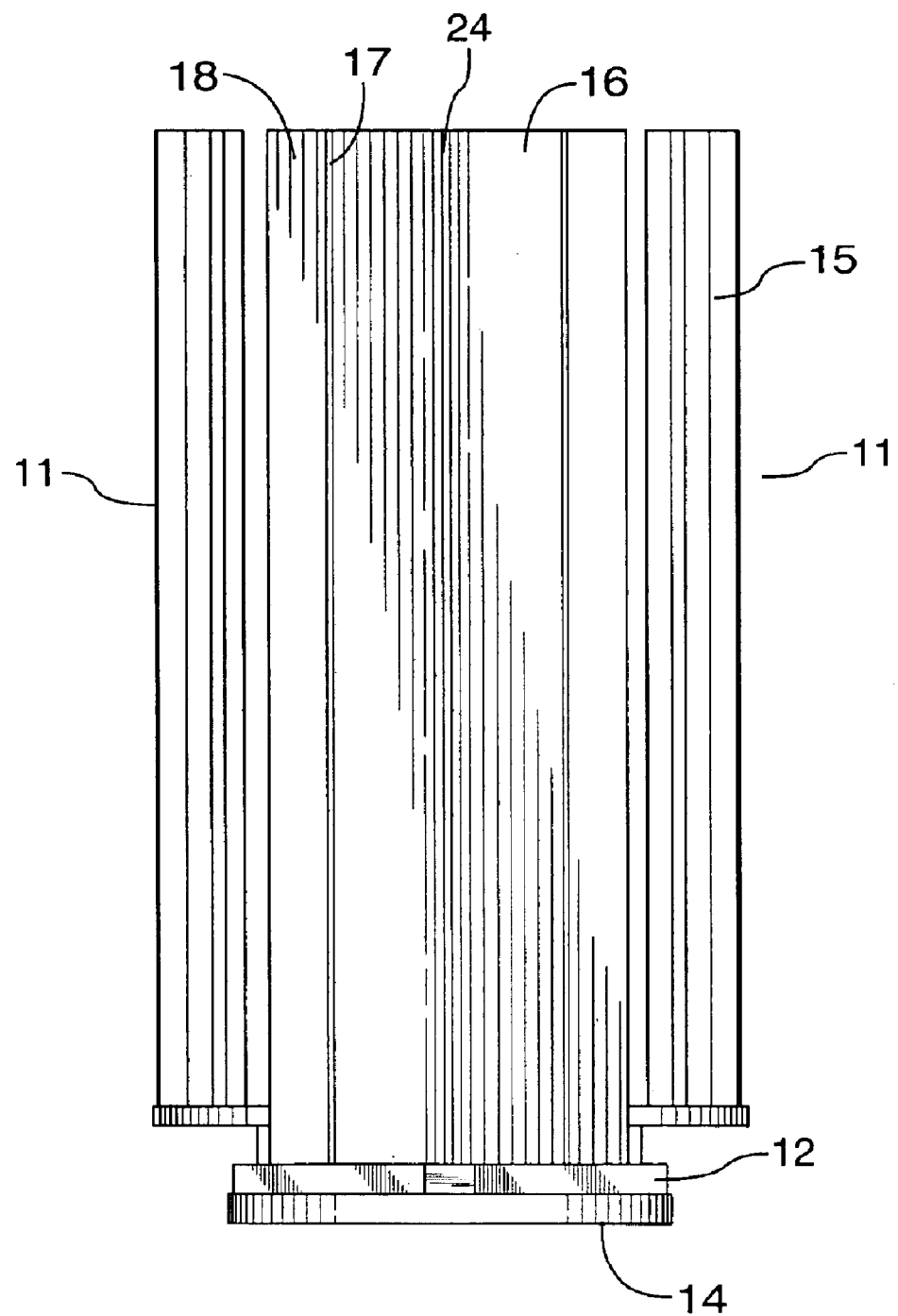
FIG. 2 is a front view of the exemplary embodiment.
Figure 3:
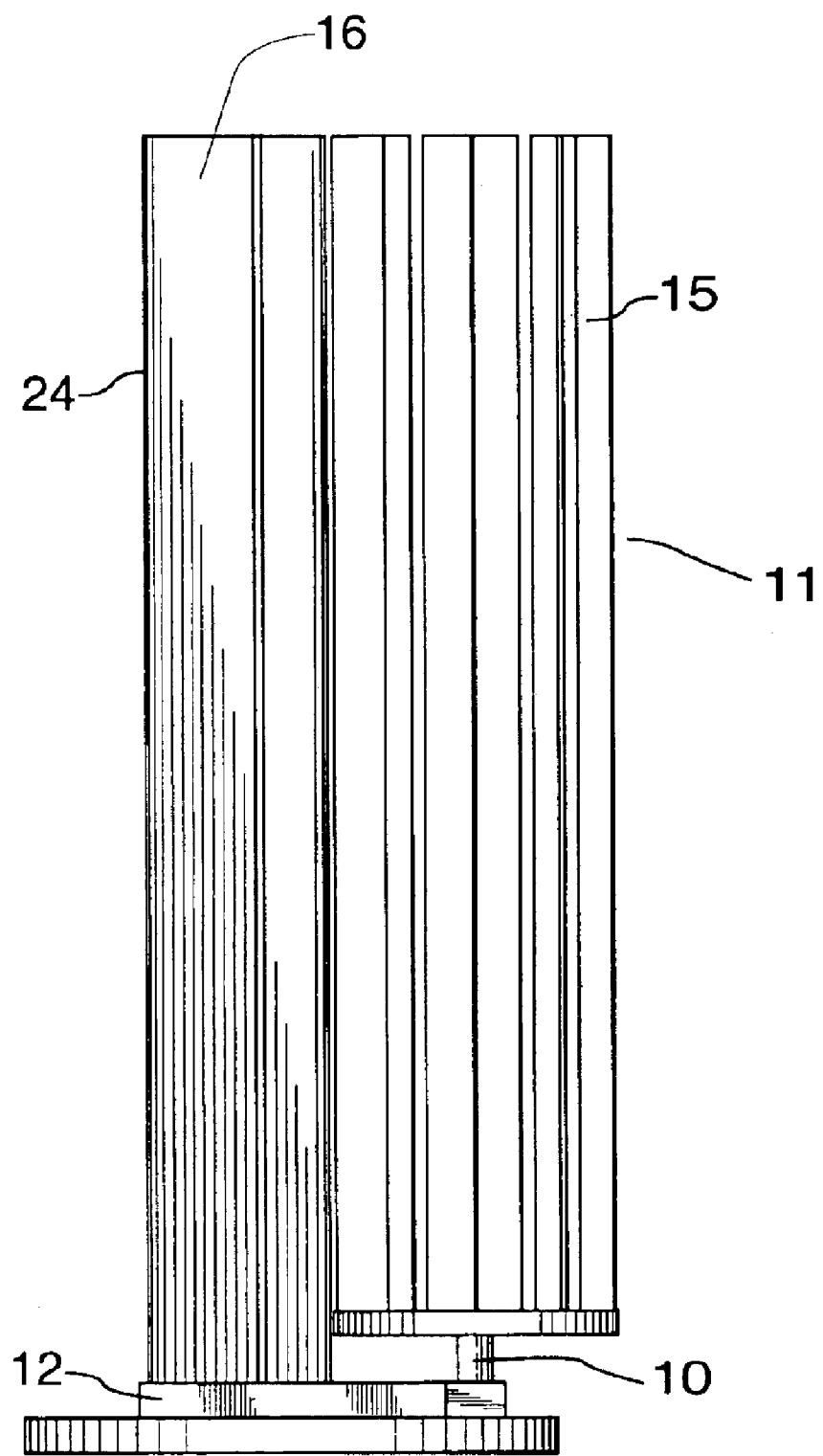
FIG. 3 is a side view of the exemplary embodiment.
Figure 4:
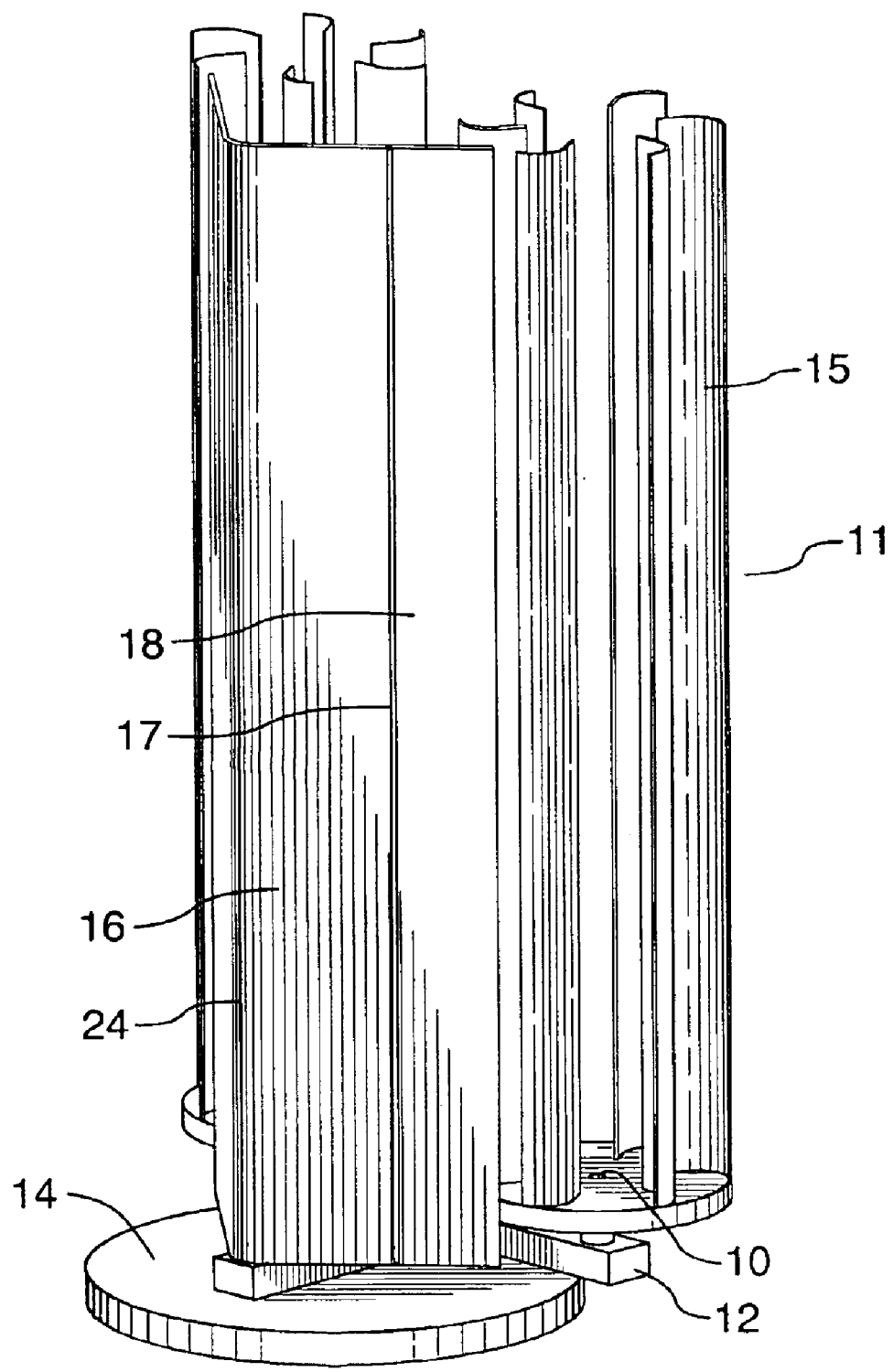
FIG. 4 is a perspective view of the exemplary embodiment.
Figure 5:
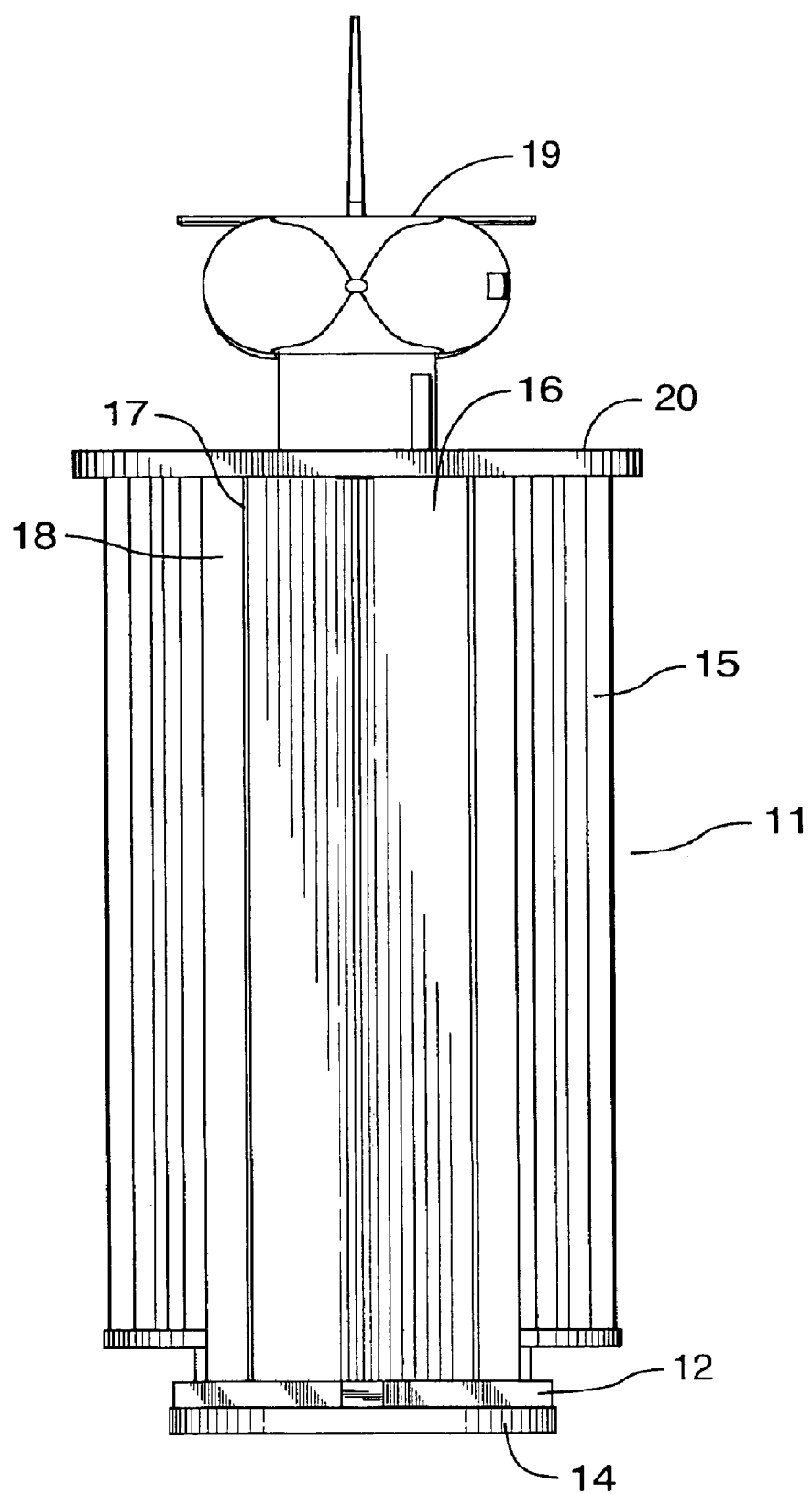
FIG. 5 is a front view of an embodiment including an aircraft-shaped structure supported above the VAWT.
Figure 6:
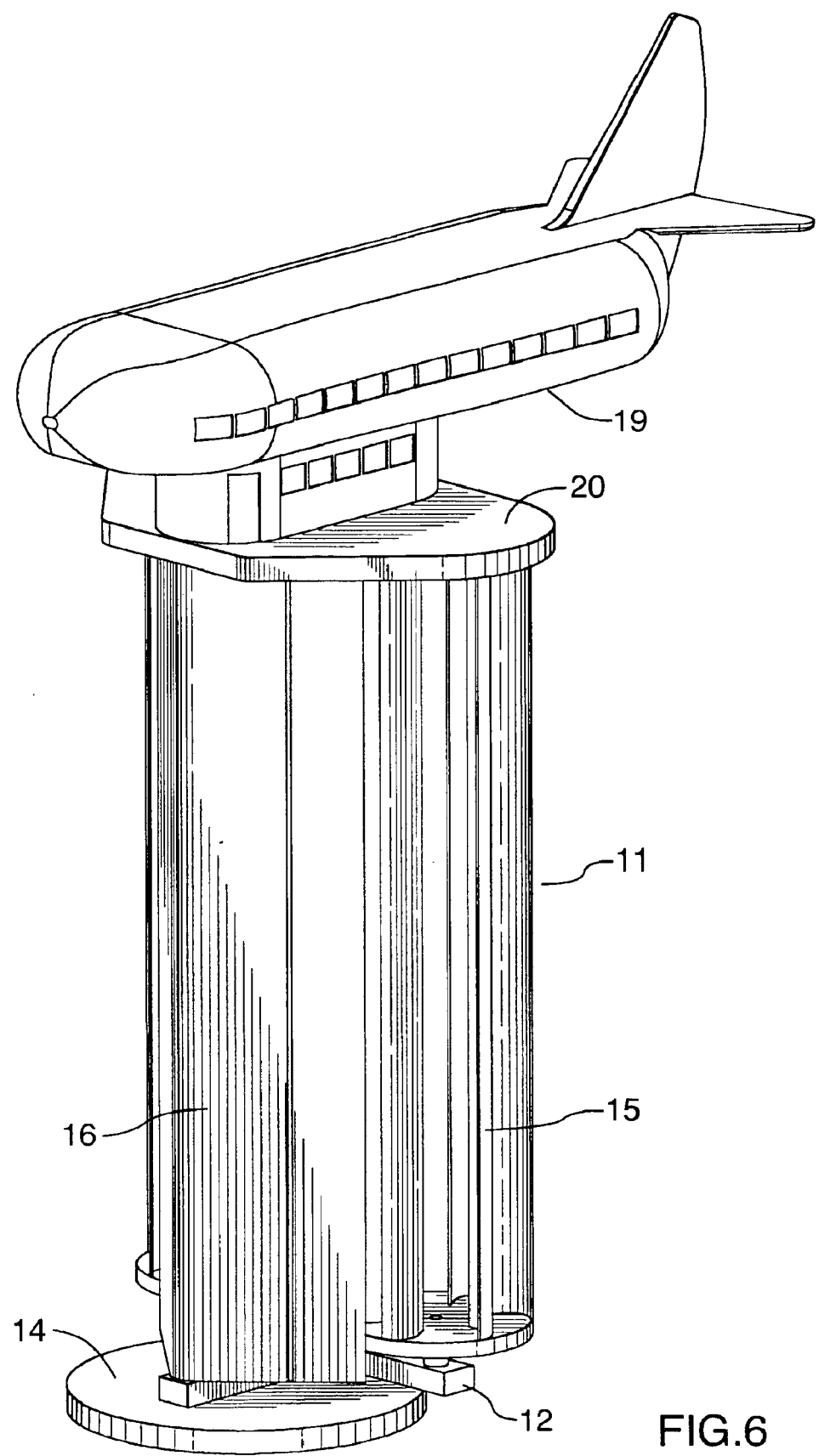
FIG. 6 is a perspective view of the FIG. 5 embodiment.
Figure 7:
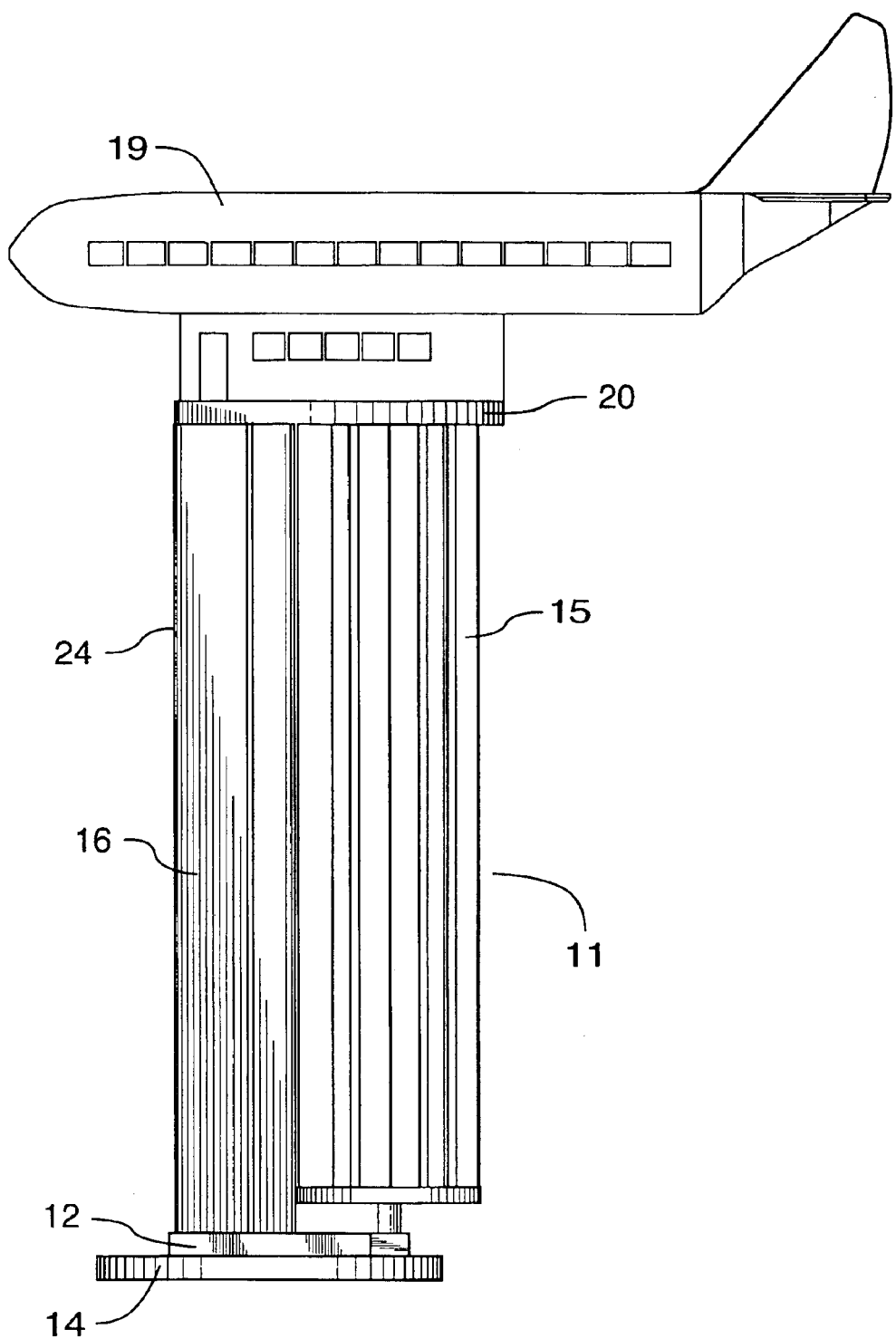
FIG. 7 is a side view of the FIG. 5 embodiment.

FIGS. 2–4 are corresponding front, side and perspective views. FIGS. 1–4 are schematic, in that no upper support structure is illustrated, for greater clarity. However, in practice there would be an upper support structure similar to the support structure 12, to provide sufficient support for the rotor axes and guide vane. As illustrated in FIGS. 5–6 and as described in greater detail below, this upper support structure could be used to provide a functional structure, an aircraft-shaped restaurant 19 being one example.

In the twin rotor arrangement of the invention, there are two counter-rotating rotors 11 and the curved guide vane 16 in front of them. The guide vane keeps the assembly oriented as shown in FIG. 1, i.e. with the guide vane always pointing into the wind, and shields both the returning blade sectors of the rotors. It also offers the opportunity to move the twin rotors apart, creating a larger swept area with no increase in rotor diameter. Of course, this possibility has its limits and the inventor's preliminary test results indicate that there may be an optimal distance between the rotor centers in the range of 1.5 to 2 rotor diameters. A distinct advantage, for the design and construction of the space between the twin rotors, is the possibility of building a support structure behind the guide vane, to stabilize it against the dynamic pressure created by airflow stalled at and divided by the vertex of the guide vane. Although the optimal form of the curved guide vane would look like the front half of a falling drop, the best angle of attack at the two vertical edges adjacent to the rotor blades' circular paths, is the decisive factor and ultimately dictates the preferred overall shape. For the sake of simple design, a circular shape, representing a segment of a cylinder, may turn out to be the best compromise. Another effective form would be just two straight blades joined by a vertical, rounded edge, in the front center of the structure, which is what is illustrated in FIG. 1. The support structure 12 on which the guide vane and rotors are mounted is rotatable around the center axis 13, which is located on a line perpendicular to a line joining the axis between the two rotor axes 10, halfway between them. Thus the effect of the structure is that it is self-aligning with the airflow direction.

Described in another way, the VAWT has two counter-rotating rotors 11 mounted on first and second spaced apart vertical axes 10. Each rotor has a plurality of rotor blades 15 extending generally inwardly from an outer circumference, the vertical axes being mounted on a support structure 14 which is in turn rotatable on a third vertical axis 13 on a platform (not illustrated). The third axis is spaced from a point midway between the first and second axes in a direction at 90 degrees to and forward from a line between the first and second axes. The VAWT further has a guide vane 16 mounted on the support structure, having a vertex 24 forward of the third vertical axis in the direction at 90 degrees from a line between the first and second axes. The guide vane has left and right symmetrical vane portions extending towards the rotors so as to direct airflow from wind primarily towards portions of the rotors outboard of the first and second axes. The guide vane also tends to keep the VAWT oriented with the guide vane's axis of symmetry pointing forwardly into the wind.

The guide vane 16 may be provided with two vertical hinges 17, attaching two rotatable deflector flaps 18 to the guide vane. These two deflector flaps, controlled for example by a servo gear motor (not shown), will allow partial or total diversion of the airstream, thus facilitating the safe operation at higher than rated wind speeds.

Preferably, the rotor blades are curved in airfoil-like shapes relative to the airflow for enhanced efficiency relative to that of a straight blade. Thus in FIG. 1 it can be seen that the blades may have curved outer portions which straighten out towards the center of the rotor. In the preferred embodiment, the rotors have six blades each.

Another feature of the preferred embodiment is the ratio between the chord length of the blades and the rotor diameter preferably being approximately one quarter. This is not essential, and may vary with the scale and other details of configuration, but appears to be optimum based on wind tunnel testing to date.

It is an advantage of the invention that its structure, particularly with the guide vane 16, permits the width of the swept area to be significantly larger than just the two rotor diameters.

A strong support structure between the rotors (not illustrated), with the vertical guide vane an integral part of it, lends itself to supporting on its top any useful feature, not necessarily related to power generation. Such an unrelated addition may generate more income via tourism than the generation of electricity. A preferred example would be a restaurant 19, perhaps in the shape of things associated with air or wind, e.g. an airship or aircraft on an upper platform 20.

Summary of Wind Tunnel Test Results

The inventor has conducted comprehensive tests with a variety of different parameters and configurations, e.g. quantity of blades, shape of blades, angle of attack; blade chord length and rotor diameter; rotor freely rotating in unrestricted/open air stream (omni-directional); rotor surrounded by a cage of fixed guide vanes (omni-directional); rotor surrounded by movable guide vanes (mono-directional); and finally, air directed to the rotor by a single plate guide vane (mono-directional).

According to these test results, the best results regarding the parameters of the rotor as such, in all possible configurations, are:

Blade shape: the outer half circularly curved with the inner half straight.

Angle of attack: inner, straight half radial, pointing to center.

Chord length of blade: ¼ of the rotor diameter.

Quantity of blades: six.

However, it should be clearly understood that the invention is not limited to these particular features, but rather the invention is defined more broadly in the accompanying claims, which define the general structure rather than specific features which may be desirable for optimization purposes.

The power output, measured in Volts with a constant load with various guide vanes or without any:

Omni-directional: rotor, free in airstream 2.5 Volts

Omni-directional: rotor, with fixed guide vanes 4 to 5 Volts

Mono-directional: rotor, with optimized moveable guide vanes 5 to 6 Volts

Mono-directional: rotor, with one plane guide plate 12.4 Volts

Omni-Directional means: no need to line up with wind direction.

Mono-Directional means: need of turning into wind.

Additional Observation: while the power output appears not too sensitive to the shape of the rotor blades and their angle of attack, the relative position of the guide vanes is relation to the blades is important. Optimum efficiency may require experimentation in any given installation, to direct the airstream as effectively as possible towards the rotor blades at a suitable angle relative to the blades and with minimum energy loss.

The inventor therefore concluded that to build a high efficiency VAWT, one has to abandon omni-directionality; the airflow has to be guided; and the "returning" blades, traveling against the airflow, have to be shielded.

Other Considerations:

The power output of any wind turbine generally is a linear function of the so-called swept area; in case of a VAWT expressed with the product of rotor diameter and rotor height: D×H. The other, more influential factor is wind speed, which weighs in at power 3.

The power output of a wind turbine is also a function of its rotation speed in RPM, which is linearly linked to wind speed and rotor diameter. The bigger the diameter, the lower the RPM.

Since one cannot build VAWT rotors interminably tall, the rotor diameters grow with the desired power output and, respectively, the swept area.

Bigger rotor diameters cause lower RPMs and subsequently bigger gearboxes with the related disadvantages, apart from the difficult rotor construction as such.

One already-suggested solution would be to dissolve the horizontal width of the swept area into an entire wall with a multitude of slim/slender rotors. But this would render the set-up mono-directional, with the related disadvantages. One may imagine an entire wall spiked with rotors, of say 50 m wide and 200 m tall to be turned into the wind, just to talk about a system generating a few megawatts at average wind speeds i.e. 20 km/h. Further, to link the multitude of rotors, either mechanically and/or electrically, would cause nightmares.

A single, big diameter rotor, with a single plate guide vane, in a size applicable for commercial wind power generation, would soon become too great a challenge with regard to the necessary, unwieldy support structure. One has only to envision the statics of a single plate guide vane, rotatable around the rotor, in a 50 m×200 m swept area scenario.

These concepts would not be commercially viable and would pose unacceptable technical challenges, whereas the present invention appears to be entirely feasible and practical.

Note that the gearbox and other equipment required for power generation is not specifically described or illustrated. This is not considered to be part of the invention itself, and is clearly within the ordinary skill of those knowledgeable in the field. The vertical axes 10 will obviously be connected via some kind of gearbox or via belts or chains to drive a generator mounted on the support structure 12.

What is claimed is:

1. A vertical axis wind turbine, comprising two counter-rotating rotors mounted on first and second spaced apart vertical axes, each said rotor having a plurality of rotor blades extending generally inwardly from an outer circumference, said vertical axes being mounted on a support structure which is in turn rotatable on a third vertical axis on a platform, said third axis being spaced from a point midway between said first and second axes in a direction at 90 degrees to and forward from a line between said first and second axes, said vertical axis wind turbine further comprising a guide vane mounted on said support structure, having a vertex forward of said third vertical axis in said direction at 90 degrees from a line between said first and second axes, said guide vane having left and right symmetrical vane portions extending towards said rotors so as to direct airflow from wind primarily towards portions of said rotors outboard of said first and second axes, said guide vane also tending to keep said vertical axis wind turbine oriented with said guide vane's axis of symmetry pointing forwardly into the wind, further comprising movable deflector flaps pivotally mounted adjacent opposite ends of said left and right vane portions for movement about a generally vertical axis, forwardly from a position where they are generally coplanar with said vane portions, for deflecting air at least partially away from said rotors.

2. A vertical axis wind turbine as in claim 1, wherein said guide vane substantially shields portions of said rotors inboard of said first and second vertical axes.

3. A vertical axis wind turbine as in claim 2, wherein said rotor blades are curved in airfoil-like shapes relative to said airflow for enhanced efficiency relative to that of a straight blade.

4. A vertical axis wind turbine according to claim 3, including a support structure supporting an unrelated structure above the wind turbine.

5. A vertical axis wind turbine according to claim 2, including a support structure supporting an unrelated structure above the wind turbine.

6. A vertical axis wind turbine as in claim 1, wherein said rotor blades are curved in airfoil-like shapes relative to said airflow for enhanced efficiency relative to that of a straight blade.

7. A vertical axis wind turbine according to claim 6, including a support structure supporting an unrelated structure above the wind turbine.

8. A vertical axis wind turbine according to claim 1, including a support structure supporting an unrelated structure above the wind turbine.

* * * * *

UNITED STATES PATENT AND TRADEMARK OFFICE
CERTIFICATE OF CORRECTION

PATENT NO.     : 6,942,454 B2
DATED          : September 13, 2005
INVENTOR(S)    : Ohlmann, Hans-Armin It is certified that error appears in the above-identified patent and that said Letters Patent is hereby corrected as shown below:

Column 5,
Lines 26 to 27, delete and replace with -- wherein said rotor blades are curved in airfoil-like shapes relative to said airflow for enhanced efficiency to that of a straight blade --.

Column 6,
Lines 21 and 28, delete "claim 2" replace with -- claim 1 --.
Line 25, delete "claim 3" replace with -- claim 2 --.
Line 31, delete "claim 1" replace with -- claim 2 --.
Lines 32-34, delete and replace with -- including a support structure supporting an unrelated structure above the wind turbine. --.
Line 35, delete "claim 6" replace with -- claim 5 --.
Line 38, delete "claim 1" replace with -- claim 6 --.

Signed and Sealed this

Thirty-first Day of January, 2006

JON W. DUDAS
*Director of the United States Patent and Trademark Office*